Nov. 9, 1948.    W. S. HORTH    2,453,438
ELECTRIC WELDING APPARATUS
Filed April 11, 1946

Inventor
WILLIAM S. HORTH
By Hull & West
Attorneys

Patented Nov. 9, 1948

2,453,438

UNITED STATES PATENT OFFICE 2,453,438

ELECTRIC WELDING APPARATUS

William S. Horth, Cleveland Heights, Ohio

Application April 11, 1946, Serial No. 661,194

9 Claims. (Cl. 219—4)

This invention relates to a welding apparatus and has for its general object to provide, for existing spot-welding machines, attachments of a comparatively simple and inexpensive nature which can be readily applied thereto for the purpose of enabling them to accomplish seam welding and the parts of the said attachments which may interfere with the subsequent operation of the machines for spot-welding can be readily removed from the latter when it is desirable to employ them for their normal spot-welding operations.

Figure 1:
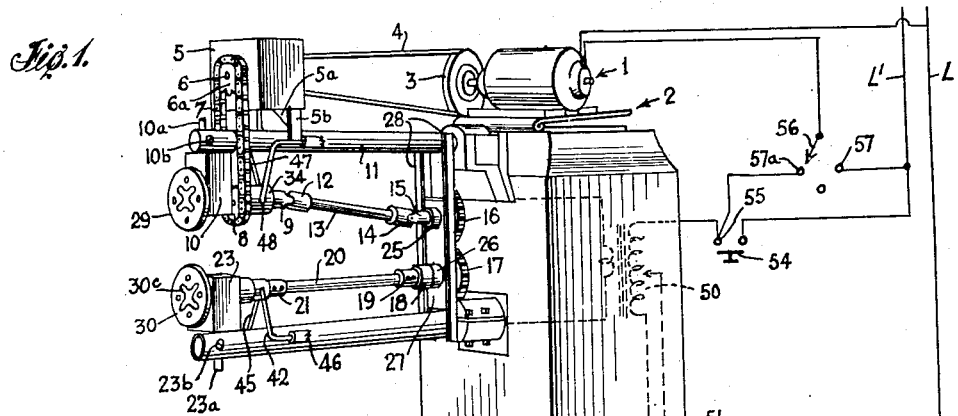
Figure 2:
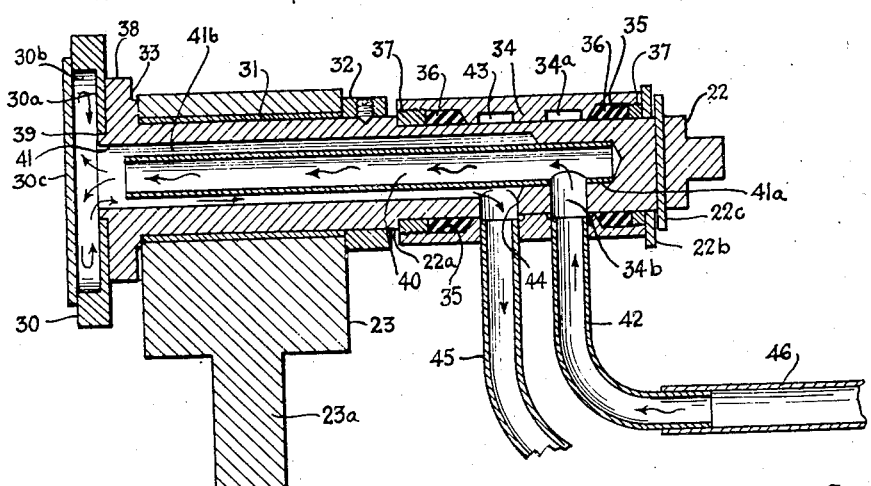

The construction and arrangement of parts whereby I accomplish the foregoing general object, as well as other and more limited objects to be set forth hereinafter, are shown in the drawings hereof, wherein Fig. 1 represents a perspective view of a spot welder of the rocker arm type having attached thereto means for enabling it to be used for seam welding purposes and also showing diagrammatically the necessary electric controls for enabling both types of welders to be used; Fig. 2 is a central longitudinal sectional view through the lower welding wheel and its shaft and the mounting for the latter; and Fig. 3 an elevational view of the welding wheel shown in Fig. 2.

Describing by reference characters the various parts illustrated in the drawings, A denotes a housing for a spot welder of a well known type having a motor 1 mounted upon a hinged motor base 2, the motor shaft carrying a multiple stepcone pulley 3 from which a belt 4 leads to a pulley (not shown) on a shaft of a double wormgear speed-reducer 5. The speed-reducer is supported upon the upper welding arm 11 by means of a saddle 5ª having side clamping members 5ᵇ engaging opposite sides of the said welding arm and detachably connected thereto. 6 denotes the output shaft from the said speed reducer, said shaft having a sprocket 6ª thereon, by means of which and a chain 7 a sprocket 8 on a front shaft section 9 is driven from the output shaft. This shaft section is mounted within a bearing block 10 having a shank 10ª adapted to be received within the vertical bore provided in the upper welding arm 11 for the reception of the regular spot-welding electrode and being secured in said arm by means of a clamp screw 10ᵇ. The shaft section 9 is connected by a universal joint 12, shaft section 13, and universal joint 14 with the rear shaft section 15 having thereon the gear 16 meshing with the gear 17 on a rear shaft section 18 connected by a rigid coupling 19 with the shaft section 20, which in turn is connected by a rigid coupling 21 with the shaft section 22 (see Fig. 2), mounted within the lower bearing block 23 similar to the bearing block 10 and having a shank 23ª adapted to be received within the bore provided for the regular spot-welding electrode and being secured in said bore by a clamp screw 23ᵇ, whereby the said block is supported by the lower arm 24 of the spot welder.

The shaft sections 15 and 18 are mounted within collars 25 and 26, respectively, carried by an insulating bearing block 27 which is detachably connected to the inner ends of the spot-welding arms 11 and 24, as by means of side straps 28 and which block also supports the gears 16 and 17 and the shaft sections connected thereto. The former gear is preferably made of steel or bronze while the latter gear is made of non-metallic material, thereby to avoid the possibility of short-circuiting. The outer end of each of the outer shaft sections 9 and 22 has a welding wheel 29, 30, respectively, secured thereto. The outer shaft sections 9 and 22 and the welding wheels secured thereto are provided with means for cooling the same. The manner in which the said shaft sections are supported by their respective welding blocks and the means whereby these sections and the welding wheels supported thereby are cooled are shown in detail in connection with the lower shaft section 22 in Fig. 2. By reference to the latter figure it will be seen that the bearing block 23 is provided with a bearing sleeve 31 (preferably of copper alloy) for the shaft section, the sleeve being retained between a collar 32 secured to the shaft section rearwardly of said sleeve and an outer annular shoulder 33 on said shaft section in front of said sleeve. The rear end of the shaft section is shown as reduced in diameter for the reception of a water jacket 34 having an annular recess 35 at each end thereof for the reception of water packing 36, the packings being retained and compacted within their recesses by means of rustproof water-packing nuts 37 mounted on the shaft section and threaded into said recesses. The water jacket is limited in end play by the shoulder 22ª at one end and by a washer 22ᵇ and a pin 22ᶜ at the other end. The front end of the shaft section 22 is provided with a cylindrical flange 38 and is also provided with a machined annular seat 39 projecting beyond the front surface of the said flange, to provide a machined fit with the rear wall 30ª of the welding wheel 30 whereby the wheel is centered on the shaft. The welding wheel is cored out for the reception of cooling water and the water circulating space 30$^b$ thus provided is enclosed by means of a cover plate 30$^c$ which is secured (preferably by high melting point solder) to the front surface of the body of the wheel. Bolts 30$^d$, preferably countersunk in the cover plate, serve to secure the wheel to the flanged end 38 of the shaft section 22.

Figure 3:
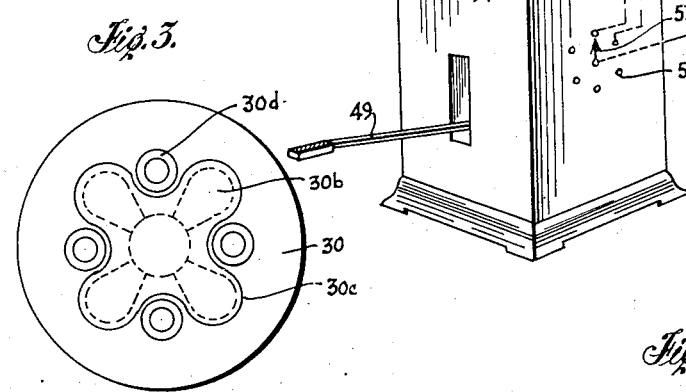

It will be noted from Fig. 3 that the water circulating space 30$^b$ comprises a central portion which communicates with the interior of the shaft section 22 and with branches which extend outwardly from this central portion between the bolts 30$^d$.

40 denotes a conduit tube the rear end of which is seated within the reduced extension 41$^a$ of a central bore 41 of the shaft section 22, the front or outer end of the tube extending short of the outer end of the bore, there being an annular conduit or passageway 41$^b$ formed between the tube and the wall of the bore. 34$^a$ denotes an annular channel which is formed within the water jacket 34 and which surrounds the inner end portion of the shaft section 22 and the rear end of the tube 40. This channel communicates through a port 34$^b$ with the rear end portion of the tube 40. 42 denotes an inlet water supply tube which is connected to the water jacket in line with and communicating with the channel 34$^a$, and 43 denotes a second annular channel surrounding the shaft section 22 and communicating with the annular space 41$^b$ surrounding the tube 40 by a port 44 which extends from said channel through the shaft section. A tube 45 is threaded into the water jacket in line with and communicating with the channel 43.

Water supplied to the tube 42, as by a hose 46 connected thereto, will be delivered through the channel 34$^a$ and port 34$^b$ into the tube 40 and will be circulated through the cored chamber 30$^b$ provided therefor in the welding wheel 30 and will be delivered through the annular space 41$^b$, channel 43 and port 44, to the outlet tube 45.

The shaft section 9 for the upper welding wheel 29 will be water jacketed in identically the same manner as is the case with the shaft section 22 and will be provided with identical means for supporting the upper welding wheel on said shaft and for circulating water through the water jacket, the shaft section and the chamber in the welding wheel. Tubes through which water is supplied to and from the upper water jacket 34 and the parts therewithin are indicated at 47 and 48, the former of which may be considered as the water supply tube and the latter as the water delivery tube. In practice, the delivery tube from the upper water jacket can be connected by the hose 46 with the inlet tube 42 for the lower water jacket.

49 denotes the usual foot pedal with which spot welders are provided, the same being connected by a vertically extending rod (not shown) with the upper spot welder arm 11 and adapted, by its depression, to rock this arm downwardly toward the arm 24. 50 denotes the welding transformer with which spot welders are usually provided, the same being connected by suitable leads 51 and 52 with a heat regulator 53, the switch arm 53$^a$ whereof is connected with one of the main current leads L. 54 denotes a switch member operable preferably by the movement of the pedal 49 to engage contacts 55, one of which is connected with the other main lead L′ and the other of which is connected with the transformer 50 thereby to close the transformer circuit; and 56 denotes a switch arm which, when thrown to the right, will engage a contact 57 to enable current to be utilized for rotating the welding wheels for the purpose of dressing the latter and, when thrown to the left, to engage contact 57$^a$ which will enable the current to be utilized for seam welding.

With the parts constructed and arranged as described, the operation will be readily understood. Current having been supplied to the motor 1, the welding wheels will be rotated in opposite directions through the gears 16 and 17, the upper arm 11 can be depressed toward the lower arm, the use of universal joints for the upper shaft sections permitting this movement without breaking the drive, and the current having been supplied to the welding wheels, the work can be seam-welded by passing the same between and in contact with both wheels in the usual manner. The fact that the lower welding wheel is positively driven enables it to cooperate with the upper welding wheel in feeding the work therebetween. The means for supplying cooling water to the welding wheels and the front shaft sections through the conduits constituted by the tube 40 and the annular circulating space surrounding the latter will prevent the wheels and front shaft sections from becoming overheated.

In practice, it may be necessary to make a slight adjustment of the switch mechanism 54, 55, in order to effect a continuous contact for seam welding when the pedal 49 is completely depressed. The welding transformer 50 and heat regulator 53 for the spot welder will be employed except that it may be necessary to reduce the heat by one or two steps on the heat regulator, due to the accumulation of continuous heat in the operation of seam welding.

In installing my attachment, it will be necessary first to turn the switch blade 56 to the left; to remove the spot welding electrodes; to secure the gear reducer 5 in place upon the upper welding arm; to secure the block 27 upon the lower welding arm with the upper ends of the side rails 28 straddling and engaging the upper welding arm and to mount the gears and the shaft sections connected thereto in the said block; to install, as a unit, the upper bearing block 10, and front shaft section with its welding wheel 29 and sprocket 8 and shaft sections 9 and 13 connected by the universal joint 12, connecting the end of the latter section by the universal joint 14 with the front end of the rear shaft section 15; and to install as a unit the lower bearing block 23, the welding wheel 30 and the shaft sections 20 and 22, connecting the former with the outer end of the rear shaft section 18 by the coupling 19; also to connect the hoses for circulating the water through the water jackets and the front shaft sections and welding wheels.

To reconvert to spot welding, it will be necessary to turn the switch 56 to its off position; remove the hose connections to the water jackets; loosen the rear set screw of the rear universal joint and also the rear set screw of the rear rigid sleeve coupling; remove the clamp screw 23$^b$ of the lower welding arm 24 and take out the lower welding wheel bearing block, the shaft, and the rear coupling as a unit. Next remove the clamp screw 10$^b$, raise the bearing block 10 to release the chain 6$^a$ and remove the chain and the upper welding wheel, the bearing block 10, shaft sections 9 and 13, and universal joints 12 and 14 as a unit. Then insert and clamp in place the spot welder electrodes; if the latter should be water cooled, then connect up their hoses therewith. Following this, the spot welding can be proceeded with. This will leave the gears 16 and 17, the block 27 and the rearmost shaft sections which are connected with said gears all set up in position to be reemployed in case it is desired to resume seam welding.

While my invention is shown herein as applied to a spot-welding machine of the rocker arm type and wherein the lower welding wheel is driven to assist in feeding the work between the welding wheels, it can be incorporated in a spot-welding machine wherein the upper welding arm is not rocked in its movement toward and from the lower welding arm and wherein the lower welding wheel is rotated only by frictional engagement of the work passing between the same and the upper wheel, as occurs in seam welding machines wherein the welding wheels are mounted at right angles to the positions of the welding wheels shown in the drawing hereof. Where the lower welding wheel is not driven by connections from the upper welding wheel shaft, the bearing block 27, the gears 16 and 17, and the shaft sections extending therefrom to the front shaft sections will be omitted.

Having thus described my invention, what I claim is:

1. Means for converting into a seam welding machine a spot welding machine provided with the necessary operating electrical circuits and having upper and lower spot welding arms and means for moving the upper arm toward and from the lower arm, the converting means comprising bearing blocks detachably connected to the respective arms and projecting toward each other, a shaft journaled in each of said bearing blocks and each having a welding wheel secured thereto, flexible drive means secured to and extending between said shafts, a shaft and means for driving the same, and driving means connecting the last mentioned shaft with the upper welding wheel shaft.

2. Means for converting into a seam welding machine a spot welding machine provided with the necessary operating electrical circuits and having upper and lower spot welding arms and means for moving the upper arm toward and from the lower arm, the converting means comprising bearing blocks detachably connected to the respective arms and projecting toward each other, a front shaft section journaled in each of the said bearing blocks and each having a welding wheel secured thereto, a bearing block detachably supported between the rear portions of said welding arms, rear shaft sections journaled in the said bearing block, gears mounted on the respective last-mentioned shaft sections and meshing with each other, an intermediate shaft section connected to the front and rear upper shaft sections by universal joints, an intermediate shaft section detachably connected to the front and rear lower shaft sections, a shaft and means for driving the same, and driving means connecting the said shaft and the upper front shaft section.

3. Means for converting into a seam welding machine a spot welding machine provided with the necssary operating electrical circuits and having upper and lower spot welding arms and means for moving the upper arm toward and from the lower arm, the converting means comprising bearing blocks detachably connected to the respective arms and projecting toward each other, a front shaft section journaled in each of the said bearing blocks and each having a welding wheel secured thereto, a bearing block detachably secured to the rear portion of the lower of said welding arms and extending upwardly therefrom, rear shaft sections journaled in the last mentioned bearing block, gears mounted on the rear ends of the respective last mentioned shaft sections rearwardly of said block and meshing with each other, an intermediate shaft section connected to the front and rear upper shaft sections by universal joints, an intermediate shaft section detachably connected to the front and rear lower shaft sections, a gear reducer detachably mounted upon the upper welding arm and having an output shaft, driving means connecting the output shaft and the upper front shaft section, a motor having a shaft and a driving connection between the motor shaft and the input shaft of said speed reducer, and means for cooling the front upper and lower shaft sections and the welding wheels thereon.

4. Means for converting into a seam welding machine a spot welding machine provided with the necessary operating electrical circuits and having upper and lower spot welding arms and means for moving the upper arm toward and from the lower arm, the converting means comprising bearing blocks detachably connected to the respective arms and projecting toward each other, a front shaft section journaled in each of the said bearing blocks and each having a welding wheel secured thereto, a bearing block detachably supported between the rear portions of said welding arms, rear shaft sections journaled in the last - mentioned bearing block, gears mounted on the respective last-mentioned shaft sections and meshing with each other, an intermediate shaft section connected to the front and rear upper shaft sections by universal joints, an intermediate shaft section detachably connected to the front and rear lower shaft sections, a gear reducer detachably mounted upon the upper welding arm and having an output shaft, flexible driving means connecting the output shaft and the upper front shaft section, an electric motor and a driving connection between the motor shaft and the input shaft of the speed reducer, each of the front shaft sections being provided with a water jacket surrounding the same and within which the said shaft sections are adapted to rotate, each shaft section being provided with conduits communicating respectively with annular channels in the water jacket surrounding the shaft section and serving to circulate liquid longitudinally of and in reverse direction in said shaft section, and liquid conducting tubes connected to the water jacket and communicating respectively with the annular channels thereof.

5. Means for converting into a seam welding machine a spot welding machine provided with the necessary operating electrical circuits and having a housing and upper and lower spot welding arms secured to said housing and means for moving the upper arm toward and from the lower arm, the said means comprising bearing blocks detachably connected to each of the said arms and projecting toward each other, front shaft sections journaled in the said bearing blocks and each having a welding wheel secured thereto, a base block detachably secured to the rear portion of the lower of said welding arms and extending upwardly therefrom, rear shaft sections journaled in the said base block, gears mounted on the rear ends of the respective last mentioned shaft sections and meshing with each other, an intermediate shaft section connected to the front and rear upper shaft sections by universal joints, an intermediate shaft section detachably connected to the front and rear lower shaft sections, a sprocket on the upper front shaft section, a gear reducer detachably mounted on the upper welding arm and having an output shaft, a sprocket on the said output shaft, and a chain connecting the said sprockets, and an electric motor having a shaft and a driving connection between the motor shaft and the input shaft of said speed reducer.

6. An attachment for a spot welding machine, having a frame and two electrode arms extending therefrom with one of said arms being movably positioned thereon, for converting the machine temporarily for use as a seam welder, said attachment comprising an electric motor, means pivotally supporting said electric motor on the frame of the spot welding machine, a speed reducer carried by the movable arm of the spot welder, flexible means connecting said speed reducer to said motor, said motor being adapted to swing about its support on said frame with changes in the position of said movable arm, a bearing block removably attached to each arm of said spot weld machine, a shaft journaled in each of said bearing blocks, a weld wheel supported on each of said shafts, means connecting said shaft on said movable spot weld electrode arm to said gear reducer, a support frame removably associated with the portions of said spot weld electrode arms immediately adjacent the spot weld machine, a pair of gears journaled in said support frame and engaged with each other, drive means connecting said shaft on said upper electrode arm to one of said gears, and shaft means engaging said shaft on said lower electrode arm with said other gear carried by said support frame whereby both of said weld wheels can be continuously driven by said motor even though the position of said movable electrode arm is varied.

7. An attachment as in claim 6 wherein one of said gears is made from an insulating material to prevent short circuit between said welding wheels.

8. An attachment for a spot welding machine, having two electrode arms extending therefrom with one of said arms being movably positioned thereon, for converting the machine temporarily to a seam welder, said attachment comprising an electric motor, means pivotally supporting said electric motor on the spot welding machine, a driven member carried by the movable arm of the spot welder, flexible means connecting said driven member to said motor, said motor being adapted to have its position changed on said spot weld machine with changes in the position of said movable arm, a bearing block attached to each arm of said spot weld machine, a weld wheel supported on a shaft journaled in each of said bearing blocks, means connecting said shaft on said movable spot weld electrode arm to said driven member, and means connecting said shaft on said upper electrode arm to said other shaft, whereby both of said weld wheels can be continuously driven by said motor.

9. An attachment for a spot welding machine, having two electrode arms extending therefrom with one of said arms being movably positioned thereon, for converting the machine temporarily to a seam welder, said attachment comprising an electric motor, means pivotally supporting said electric motor on the spot welding machine, a driven member carried by the movable arm of the spot welder, and flexible means connecting said driven member to said motor, said motor being adapted to have its position changed on said spot weld machine with changes in the position of said movable arm.

WILLIAM S. HORTH.

REFERENCES CITED

The following references are of record in the file of this patent:

UNITED STATES PATENTS

| Number | Name | Date |
| --- | --- | --- |
| 1,291,501 | Hatch | Jan. 14, 1919 |
| 1,315,939 | Agnew | Sept. 16, 1919 |
| 1,351,446 | Smith | Aug. 31, 1920 |
| 1,525,277 | Dincognito | Feb. 3, 1925 |
| 1,673,500 | Dwyer | June 12, 1928 |
| 1,778,628 | Eckman | Oct. 14, 1930 |
| 1,787,115 | Lewis | Dec. 30, 1930 |
| 1,862,108 | Brueckner | June 7, 1932 |
| 2,200,112 | Gilbert | May 7, 1940 |
| 2,266,424 | Humphrey | Dec. 16, 1941 |
| 2,336,403 | Kaunitz | Dec. 7, 1943 |
| 2,389,034 | Eisler | Nov. 13, 1945 |

FOREIGN PATENTS

| Number | Country | Date |
| --- | --- | --- |
| 326,022 | Germany | Aug. 2, 1922 |
| 552,120 | France | Jan 17, 1923 |